United States Patent [19]

Drungil

[11] 4,095,523
[45] Jun. 20, 1978

[54] BRAKE ASSEMBLY FOR MECHANICAL PRESSES

[75] Inventor: Walter J. Drungil, Chicago, Ill.

[73] Assignee: Verson Allsteel Press Company, Chicago, Ill.

[21] Appl. No.: 812,164

[22] Filed: Jul. 1, 1977

[51] Int. Cl.² .............................................. B30B 1/06
[52] U.S. Cl. .................................. 100/282; 188/170; 192/18 A
[58] Field of Search ............ 188/170; 192/91 R, 18 A; 100/282

[56] References Cited

U.S. PATENT DOCUMENTS

| 2,185,096 | 12/1939 | Treer | 100/282 X |
|---|---|---|---|
| 2,505,600 | 4/1950 | Wissman | 192/18 A |
| 2,584,191 | 2/1952 | Danly | 188/170 |
| 2,667,248 | 1/1954 | Wissman | 100/282 X |
| 2,745,338 | 5/1956 | Wissman | 100/282 |
| 2,889,021 | 6/1959 | Bass | 192/18 A |
| 3,432,014 | 3/1969 | Iwamatsu | 192/18 A |
| 3,772,986 | 11/1973 | Kawagoshi | 100/282 |
| 3,863,038 | 1/1975 | Kreitner | 188/170 |

*Primary Examiner*—Billy J. Wilhite
*Attorney, Agent, or Firm*—Wallenstein, Spangenberg, Hattis & Strampel

[57] ABSTRACT

A brake assembly for large mechanical presses of the type which employ large gears and operate at relatively high speeds. The brake assembly is especially adapted to reduce noises emanating from the brake housing of such presses due to sudden shocks and stresses placed on the mechanical gearing and drive means of the press when the reciprocating slide of the press delivers its power stroke for performing work functions on a workpiece supported on the bed of the press. The brake assembly and the clutch of the press are coupled to the main driveshaft of the press, and the brake assembly may comprise an integral unit with the clutch or it may be a separate unit.

5 Claims, 10 Drawing Figures

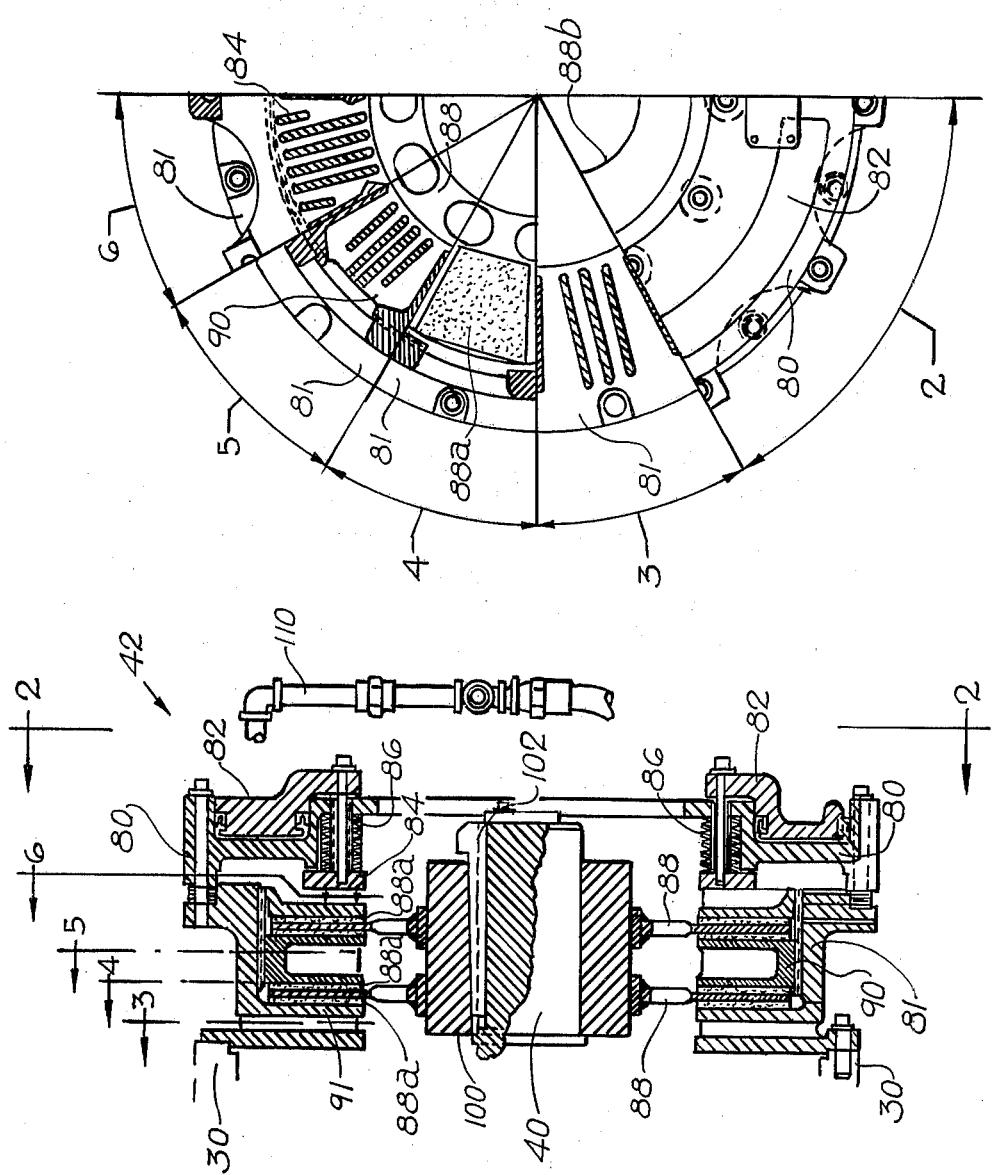

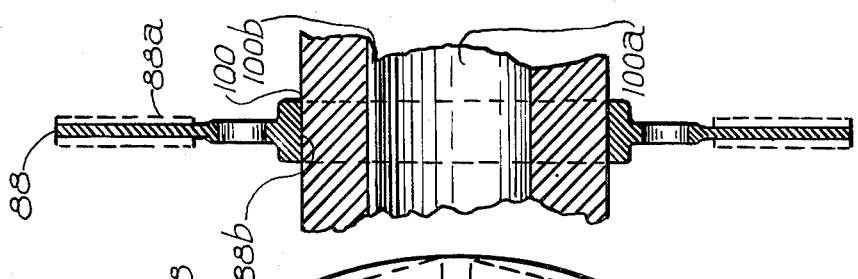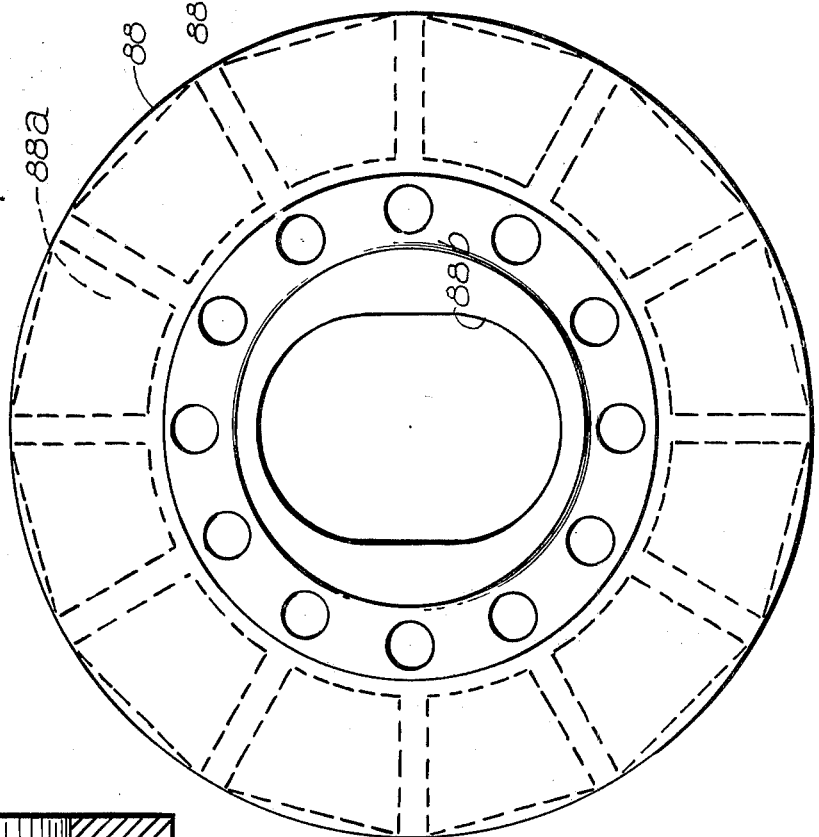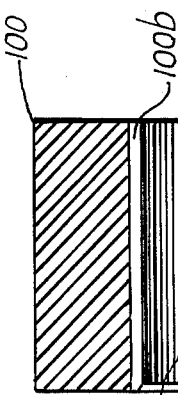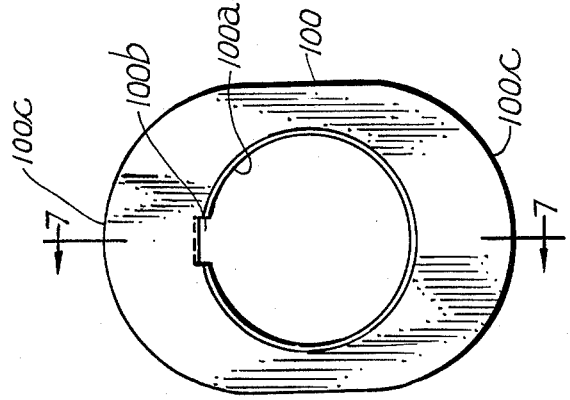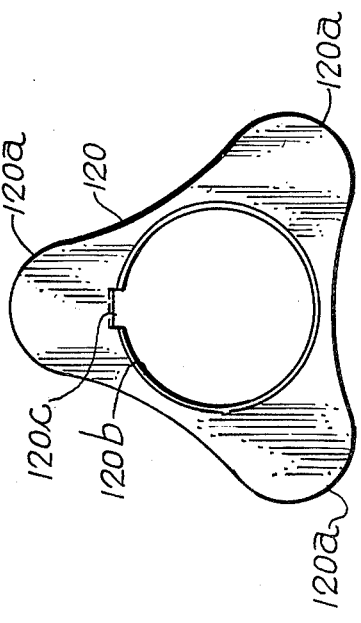

BRAKE ASSEMBLY FOR MECHANICAL PRESSES

The present invention relates to a brake assembly for mechanical presses, particularly large mechanical presses having capacities of the order of 100 tons, or more.

Large mechanical presses of the type with which the present invention is concerned normally include a bed supporting a bolster on which tooling is carried and a reciprocatable slide which carries tooling for performing work functions on a workpiece, an enclosed crown above the reciprocatable slide supported by columns carried by the bed, mechanical gearing and drive means in the enclosed crown, and one or more links operated by the mechanical gearing and drive means in the enclosed crown and extending through an opening or openings in the base of the crown to the slide for reciprocating the slide to perform the work functions on the workpiece.

Such presses also include a motor, usually mounted on the enclosed crown, which drives a plurality of belts connected to a flywheel which is releasably coupled by a clutch to a drive shaft rotatably mounted in the crown. A brake is provided, for the drive shaft. The clutch and the brake have clutch discs and brake discs, respectively, which are coupled to the drive shaft by means of hubs keyed to the drive shaft. Conventionally, the hub associated with the brake discs has a plurality of splined teeth machined on the outer surface thereof over which the brake discs, provided with mating splined teeth, are slidably fitted. When the clutch is engaged and the brake disengaged, the flywheel rotates the drive shaft, and the brake discs of the brake rotate freely with the shaft. As the slide is being lowered during its power stroke and the workpiece is engaged by the tooling to perform a work function thereon, substantial resistance to the downward movement of the slide is suddenly encountered and this resistance is transmitted by the link or links back to the mechanical gearing and the drive means. This sudden and great stress causes considerable vibration in the gear train which, in turn, causes the brake discs to vibrate on its associated splined hub. The resulting contact between the large number of splined teeth on the rotating hub and the mating splined teeth on the rotating brake discs gives rise to loud, rattling or chattering noises which are released through air flow passages in the brake housing. So far as is known, no effective means heretofore has been developed for reducing these undesired and highly objectionable noises.

In accordance with the present invention, a brake assembly for use in large mechanical presses has been evolved which not only substantially reduces stress and vibration generated noises in the brake mechanism, but does so with an arrangement which is simpler and, therefore, more economical to manufacture than the conventional splined teeth construction of brake mechanisms heretofore employed in large mechanical presses, while at the same time providing as positive, if not more positive, braking action than the conventional splined teeth construction without any overlap between the operation of the clutch and brake of the press. The brake assembly of this invention, moreover, enables these results to be attained without the need for any changes in the mechanical gearing or the drive means of a press.

The brake assembly, in brief, comprises a male member which may be formed directly on the main drive shaft of the press, or may be a separate unit which is keyed to the main drive shaft, and a female member in the form of a brake disc which is provided with a centrally located opening therethrough for receiving and engaging the female member on the male member for rotation therewith but permitting axial movement with respect thereto. The male member, in a preferred embodiment of the assembly, is non-circular, and has two diametrically opposed, integral, smooth surfaced, curved lobes which impart an oblong, or ovate, configuration to the male member. In another of its forms, the male member is provided with three, equally spaced, integral, smooth surfaced, curved lobes which impart a generally triangular configuration to the non-circular male member. Whether two, three, or more, lobes are provided on the male member, the centrally located opening in the female member or brake disc is shaped to conform to the outer configuration of the male member. The lobes of the male member cause rotation of the female member with the main drive shaft when the clutch of the press is engaged and the brake of the press is disengaged. When, however, the clutch is disengaged and the brake of the press is engaged, rotation of the female member is prevented by the brake mechanism and the lobes of the male member instantly and positively engage the female member thereby stopping rotation of the main drive shaft. The action takes place essentially instantaneously thereby eliminating any overlap between the operation of the clutch and the brake of the press. Over and above the positive braking action attained with the brake assembly of the present invention, the arrangement of the lobed male member and the correspondingly shaped central opening in the female member eliminates the splined teeth on the hub and brake discs conventionally employed in brakes for large mechanical presses. As a result, the loud, objectionable chattering noises normally caused by the vibration of the splined brake discs on the splined hub of the brake are eliminated, and noises emanating from the brake housing due to sudden shocks to, and the concomitant vibration of, the gear train are substantially reduced.

The foregoing, and other advantages and features of the brake assembly of the present invention will become clear from the following description when taken in conjunction with the accompanying drawings wherein:

FIG. 4 is an enlarged fragmentary sectional view showing an embodiment of the brake assembly illustrated in FIG. 3;

FIG. 5 is a fragmentary multiple sectional view taken substantially along lines 2—2, 3—3, 4—4, 5—5 and 6—6 of FIG. 4;

FIG. 6 is an end view of one embodiment of the male member of the brake assembly mounted on the drive shaft of a press;

FIG. 7 is a sectional view taken substantially along line 7—7 of FIG. 6;

FIG. 8 is an end view of another embodiment of the male member of the brake assembly mounted on the drive shaft of a press;

FIG. 9 is an end view of an embodiment of the female member or brake disc of the assembly; and FIG. 10 is a fragmentary side view in section of the brake disc shown in FIG. 9 mounted on the male member as illustrated in FIG. 7.

Figure 1:
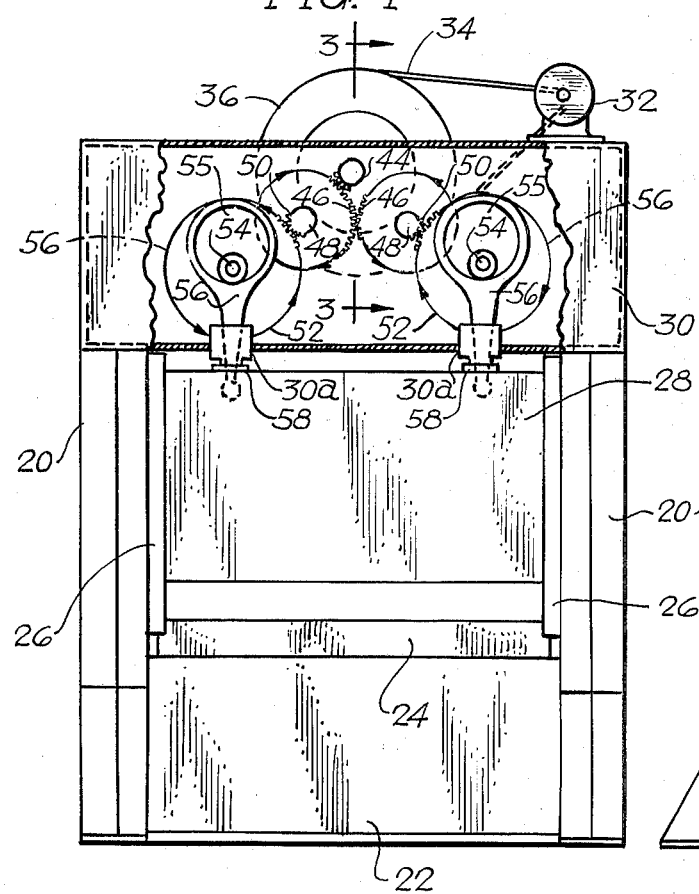
FIG. 1 is a front view in elevation of a typical mechanical press in connection with which the brake assembly of this invention is used.
Figure 2:
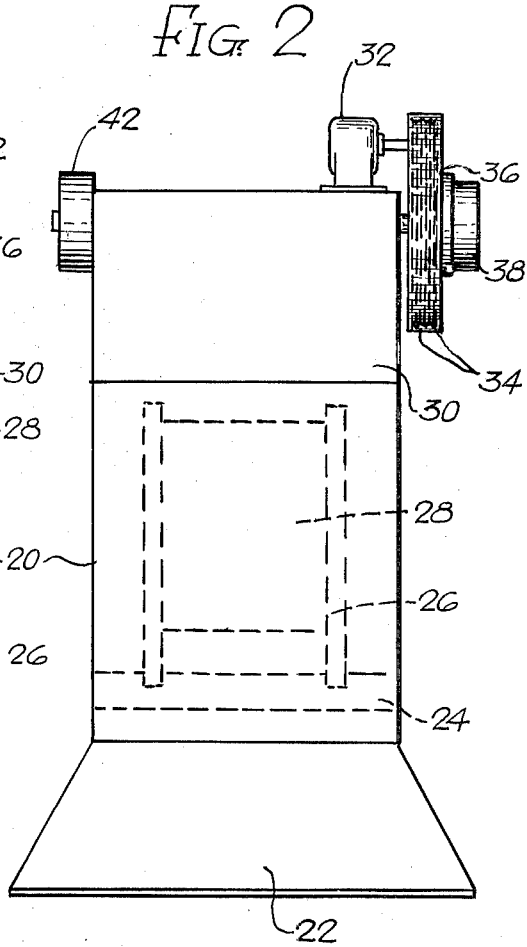
FIG. 2 is a side view in elevation of the press shown in FIG. 1 and looking from the right thereof.
Figure 3:
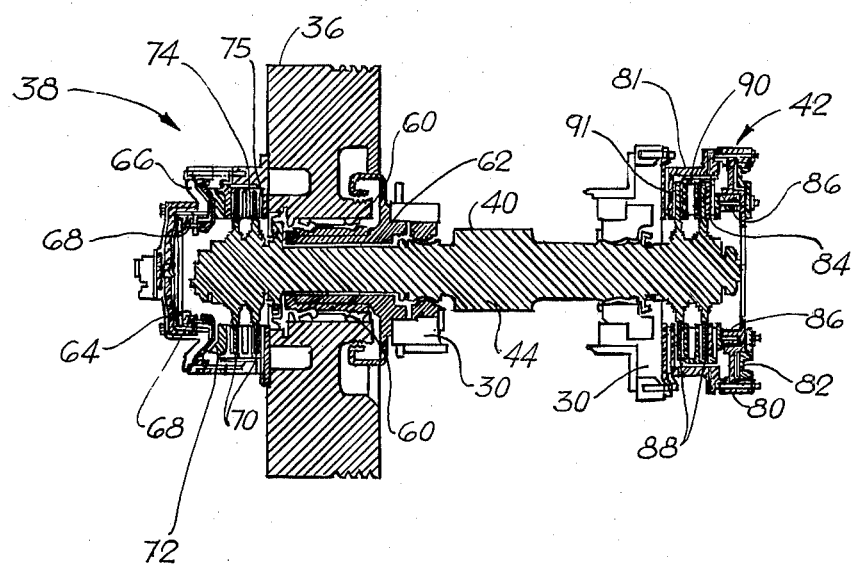
FIG. 3 is a somewhat schematic sectional view taken substantially along line 3—3 of FIG. 1 and looking from the left.

Referring, now to FIGS. 1 through 3 of the drawings, an embodiment of a large mechanical press, shown somewhat schematically, comprises a pair of columns 20—20 secured to and supported by a bed 22. A bolster 24 is removably positioned on the bed 22 for holding tooling for performing work functions on a workpiece (not shown). Adjustable gibs 26—26 are mounted on the inner side of each of the columns 20—20 and are adapted to act as guideways for a ram or slide 28, also carrying tooling for performing work functions on a workpiece (not shown). Positioned at the top of the columns 20—20 is an enclosed crown 30 in which the mechanical gearing and drive mechanism for the ram or slide 28 is located. Tie rods (not shown) extend through the bed 22, the columns 20 and the crown 30 for adding rigidity and strength to the press. As illustrated, the crown 30 has a motor 32 mounted on the top thereof. The motor 32 continuously drives a plurality of V-belts 34 connected to a fly wheel 36 which, in turn, is releasably coupled by a clutch 38 to a drive shaft 40 (see FIG. 3) extending from the front to the rear of the crown 30. A brake 42 for the drive shaft 40 is positioned on the opposite side of the crown 30. Briefly, when the clutch 38 is engaged and the brake 42 disengaged, the continuously driven flywheel 36 rotates the drive shaft 40 for moving the slide 28, and when the clutch is disengaged and the brake applied, rotation of the drive shaft is stopped. The operation of the clutch and the brake will be described in greater detail hereinafter.

The press shown in FIGS. 1 and 2 for purposes of illustration, is of the double geared, twin drive type, and to this end, as best shown in FIG. 1, the drive shaft 40 has a drive pinion 44 which rotates a pair of intermediate meshing gears 46—46 on intermediate shafts 48—48 which, in turn, through intermediate pinions 50—50, drive a pair of main gears 52—52 each of which is mounted on a crankshaft 54. Each crankshaft 54 has a crank in the form of an eccentric 55 for receiving an end of a connecting strap or pitman or link 56. The lower end of each pitman or link 56 extends through an opening 30a in the base of the crown 30, and into a slide-mounted connection housing 58 where it is joined by means of a wrist pin and saddle mechanism for vertically reciprocating the slide 28 as the drive shaft 40 is rotated. The capacity of a press such as the one illustrated in FIGS. 1 and 2 can, as stated, range from 100 tons and upwards. The speed of such a press can vary from about 15 strokes to about 60 strokes per minute.

In FIG. 3 of the drawings, a clutch and brake mechanism for use in a press, such as the press shown in FIGS. 1 and 2, is somewhat schematically illustrated. The clutch 38 and the brake 42 are, for purposes of illustration, shown as separate units. However, it should be understood that the clutch and brake mechanism may be positioned in side-by-side relation as a mechanically interconnected unit. The clutch 38 and the brake 42 constitute the interconnecting link between the flywheel 36 and the gear train of the press and, to this end, the clutch and the brake are both keyed to the main drive shaft 40.

The flywheel 36, which revolves continuously during operation of the press, is mounted on roller bearings 60 carried on a stationary quill 62 supported by the frame of the crown 30. The clutch 38, as shown, comprises a clyinder or housing 64 which is secured to and rotates with the flywheel 36 and which has a piston 66. Clutch springs 68—68 are provided for normally urging the piston 66 to the left as shown in FIG. 3. In this position, the clutch 38 is disengaged. The clutch 38 also has clutch lining discs 70—70 mounted for rotation on the shaft 40, and an outer driving disc 72, an intermediate driving disc 74 and an inner driving disc 75 all mounted for rotation with the flywheel 36. The housing 64, the piston 66 and the driving discs 72, 74 and 75 revolve continuously with the flywheel 36. The clutch lining discs 70—70 rotate on cycle, that is, when the clutch is engaged, the discs 70—70 revolve with the flywheel 36. When the clutch is disengaged and the brake engaged, the rotation on the discs 70—70 is stopped with the drive shaft 40.

The brake portion of the clutch and brake mechanism shown in FIG. 3 comprises a brake cylinder 80 supported through a housing 81 by the frame of the crown 30, a brake piston 82, an outer brake pressure plate 84, an intermediate brake pressure plate 90, an inner brake pressure plate 91 and brake springs 86—86, which are all held against rotation, and brake lining discs 88—88 which rotate with the shaft 40. The brake springs 86—86 normally urge the piston 82 to the left as shown in FIG. 3. In this position, the brake 42 is engaged. Except for the brake lining discs 88—88, the remaining portions of the brake assembly are not rotated by the shaft 40.

The clutch and the brake desirably are pneumatically actuated. Thus, to disengage the brake and to engage the clutch, air under pressure is introduced into brake cylinder 80 and clutch cylinder 64. The air acts to move the brake piston 82 (to the right in FIG. 3) so as to compress the brake springs 86—86 thereby releasing the pressure normally exerted by the springs 86—86 on the brake lining discs 88—88 through the brake pressure plates 84, 90 and 91. A clearance thereby is established between the discs 88—88 and the plates 84, 90 and 91, and the discs 88—88 are able to rotate with the shaft 40. As indicated, at the same time that pressurized air is introduced into the brake cylinder 80, air is also introduced into the clutch cylinder 64, and the clutch piston 66 is urged in a direction (to the right in FIG. 3) to overcome the springs 68—68 and cause discs 72, 74 and 75 to engage the clutch lining discs 70—70. Since the driving discs 72, 74 and 75 are mounted to the flywheel 36, when the clutch is engaged and the brake released, flywheel rotation is transmitted through the clutch lining discs 70—70 to the drive shaft 40. The reverse procedure is followed when air is exhausted from the clutch cylinder 64 and brake cylinder 80 whereupon the brake is engaged and the clutch is disengaged.

In FIGS. 4 and 5 of the drawings, the embodiment of the brake assembly shown in FIG. 3 is illustrated in greater detail. The brake assembly 42 is shown in its engaged condition. Each of the discs 88—88 has brake lining 88a—88a provided on the sides thereof. The discs 88—88 comprise the female member of the assembly of this invention and are mounted on a male member 100 secured as by a gib key 102 to the main drive shaft 40. As shown, the male member 100 comprises a separate unit in the form of a hub which can be removed from the drive shaft 40. However, as indicated previously hereinabove, the male member may be formed directly on the drive shaft and, as such, constitute an integral part of the drive shaft.

A flexible air hose 110 may be utilized for introducing air under pressure into the brake cylinder 80 to move the brake piston 82 against the action of its associated brake springs 86—86 to the right from the position shown in FIG. 4 to release the brake. Radially extending air passageways are formed in the housing 81 circulating air and dissipating the heat generated when the brake assembly is engaged for halting rotation of the drive shaft 40. The discs 88—88 and the male member or hub 100 are the only portions of the brake assembly which are rotated by the shaft 40 when the clutch of the press is engaged and the brake is disengaged.

In FIGS. 6 through 10 of the drawings, embodiments of the male member and female member of the brake assembly of the present invention are shown in greater detail. The embodiment illustrated in FIGS. 6 and 7 corresponds to the male member 100 of FIG. 4, and comprises a symmetrical bi-lobed, oblong, elliptically or regular ovally shaped hub-like unit having a central bore 100a therethrough. A keyway or key-slot 100b is formed along the length of the central bore 100a, at the periphery thereof, for receiving a key such as gib key 102 for securing and maintaining the male member 100 on the main drive shaft 40. The lobes 100c—100c of the member 100 are located along, and are bisected by, the longer transverse axis of the member 100.

The female member or brake disc 88 (see FIG. 9) has a centrally located opening therethrough 88b for receiving and engaging the disc 88 on the male member 100 (see FIG. 10). The opening 88b has one transverse axis which is longer than the other thereby imparting a shape to the opening 88b which corresponds to the oblong or regular oval shape of the male member or hub 100. The dimensions of the opening 88b of the brake disc 88 are such that the disc 88 can be moved longitudinally with relation to the axis of rotation of the shaft 40, but not in a direction transverse thereto. Brake lining 88a is circumferentially arranged in spaced apart relation on each face of the disc 88.

In FIG. 8 of the drawing, another embodiment of the male member or hub comprising the brake assembly of this invention is shown. As illustrated, the member or hub 120 has three equally spaced lobes 120a formed thereon, and is provided with a centrally located bore 120b therethrough for receiving and engaging the hub 120 on the main drive shaft of a press. A keyway or slot 120c is formed in the hub 120 along the periphery of the bore 120b. The angle defined between any two adjacent lobes of the hub 120 by two intersecting planes passing through the apex of each lobe and the center of bore 120b would divide the hub 120 into two equal halves. A female member or brake disc (not shown) adapted to be engaged on the hub 120 would have a central bore therethrough which would correspond in shape to the configuration of the tri-lobed hub 120.

In utilizing the brake assembly of this invention in a press such as the one illustrated in FIGS. 1–3, the male member or hub 100 and the brake discs 88 are mounted on the main drive shaft 40 of the press as shown in FIG. 4. When the clutch of the press is engaged and the brake released, the member 100 and its associated brake discs 88 rotate with the shaft 40. This is made possible by introducing air under pressure from the flexible hose 110 into the brake cylinder 80 as air is introduced into the clutch thereby causing the brake piston 82 to move to the right to compress the brake springs 86—86 and release the contact between the brake discs 88 and the brake plates 84, 90 and 91. When the clutch 38 is disengaged, the air in the brake cylinder is vented, and the brake springs 86—86 force the brake plates 84, 90 and 91 against the brake discs 88. The pressure of the brake plates 84, 90 and 91 on the brake discs 88 halts the rotatory movement of the discs 88, and the lobed arrangement of the hub 100, which is keyed to the drive shaft 40, prevents rotation of the hub 100 in the opening 88b of the discs 88. Thus, rotation of the shaft 40 is positively and essentially instantaneously stopped without overlap between the operation of the clutch and brake. What is more, since the hub and brake disc arrangement of the brake assembly of this invention eliminates the large number of mating splined teeth found on conventional hubs and brake discs used in mechanical presses, the loud, rattling or chattering noises generated by the multitude of splined teeth as they make contact with one another due to the vibration of the gear train caused by the sudden shocks transmitted to the gear train on the downstroke of the slide of the press are no longer a problem.

While the invention has been illustrated and described with relation to certain specific embodiments thereof, it should be understood that variations in the details of the device as shown and described may be made by those skilled in the art without departing from the spirit and scope of the invention.

What is claimed is:

1. In a mechanical press of the type having a bed for supporting a workpiece, a reciprocating slide for performing work on the workpiece, a crown for supporting mechanical drive means and gear means including a drive shaft, movable link means connected between the drive means and the reciprocating slide for reciprocating the latter as the drive shaft is rotated, a clutch mechanism associated with the drive shaft for rotating the same when engaged whereby the slide is moved reciprocatably by the link means with relation to the workpiece supported on the bed of the press, and a brake mechanism associated with the drive shaft for braking the same when applied, said brake mechanism being released when the clutch mechanism is engaged and said clutch mechanism being disengaged when the brake mechanism is applied, the improvement wherein said brake mechanism comprises a brake assembly including a male member associated with the drive shaft of the drive means of the press and being rotatable with the drive shaft, said male member being non-circular and having curved lobes formed on the outer surface thereof, a female member movably mounted on the male member, said female member having a centrally located opening therethrough shaped to receive and engage the lobes of the non-circular male member and being rotatable by the drive shaft, and brake means for the female member, when applied, for stopping the female member and bringing the curved lobes of the non-circular male member into solid engagement with the female member whereby the rotational movement of the male member and the drive shaft is stopped when the clutch mechanism is disengaged, said curved lobes of the non-circular male member and the centrally located opening through the female member which is shaped to receive and engage the lobes of the non-circular male member cooperating to minimize vibration of the female member and consequent noise generated therefrom, when the brake mechanism is released and the clutch mechanism is engaged, due to stress and vibration transmitted to the drive shaft as work is performed on the work piece by the mechanical press.

2. In a mechanical press according to claim 1 wherein the male member is formed on the drive shaft of the press as an integral part thereof.

3. In a mechanical press according to claim 1 wherein the male member is a separate, bilobed unit which is keyed onto the drive shaft of the press.

4. In a mechanical press according to claim 1 wherein the male member has three circumferentially arranged, equally spaced lobes, and the centrally located opening in the female member is correspondingly shaped to receive and engage the three lobes of the male member.

5. In a mechanical press according to claim 1 wherein the female member is axially movable with relation to the male member and the drive shaft of the press.

* * * * *